United States Patent

Gregory et al.

[11] Patent Number: 5,817,154
[45] Date of Patent: *Oct. 6, 1998

[54] PROCESS FOR TREATING STAINED FABRICS WITH MANGANESE PHTHALOCYANINES

[75] Inventors: Peter Gregory, Bolton; Stephen James Reynolds, Withington; Raymond Lesley White, Radcliffe, all of United Kingdom

[73] Assignee: Zeneca Limited, London, England

[*] Notice: The term of this patent shall not extend beyond the expiration date of Pat. No. 5,730,759.

[21] Appl. No.: 520,389

[22] Filed: Aug. 29, 1995

Related U.S. Application Data

[62] Division of Ser. No. 268,578, Jul. 6, 1994, Pat. No. 5,484,915.

[30] Foreign Application Priority Data

Jul. 9, 1993 [GB] United Kingdom .................... 9314251

[51] Int. Cl.⁶ .......................... C09B 47/04; C07D 487/22
[52] U.S. Cl. .............................. 8/137; 510/281; 540/122; 540/131; 540/139; 540/140
[58] Field of Search ..................................... 540/122, 131; 8/137; 510/281

[56] References Cited

U.S. PATENT DOCUMENTS

| | | |
|---|---|---|
| H477 | 6/1988 | Barger et al. . |
| 4,318,883 | 3/1982 | Polony et al. ............................ 422/22 |
| 4,368,053 | 1/1983 | Eckhardt et al. ............................ 8/102 |
| 4,497,741 | 2/1985 | Hölzle et al. ...................... 260/245.77 |
| 4,648,992 | 3/1987 | Graf et al. ................................ 540/124 |
| 5,270,463 | 12/1993 | Itoh et al. ................................ 540/136 |
| 5,280,114 | 1/1994 | Itoh et al. ................................ 540/122 |
| 5,282,896 | 2/1994 | Tsuchida et al. ...................... 252/299.2 |
| 5,296,162 | 3/1994 | Itoh et al. ................................ 106/411 |
| 5,484,915 | 1/1996 | Gregory et al. ........................ 540/131 |
| 5,516,899 | 5/1996 | Campbell et al. ...................... 540/123 |

FOREIGN PATENT DOCUMENTS

| | | |
|---|---|---|
| 0142369 | 5/1985 | European Pat. Off. . |
| 0484018 | 5/1992 | European Pat. Off. . |
| 0484027 | 5/1992 | European Pat. Off. . |
| 519419A | 6/1991 | Japan . |
| 2200650 | 8/1988 | United Kingdom . |

Primary Examiner—Mukund J. Shah
Assistant Examiner—Pavanaram K. Sripada
Attorney, Agent, or Firm—Pillsbury Madison & Sutro LLP

[57] ABSTRACT

A substituted phthalocyanine in which at least one of the peripheral carbon atoms in the 1–16 positions of the phthalocyanine nucleus (MnPc) as shown in Formula (1)

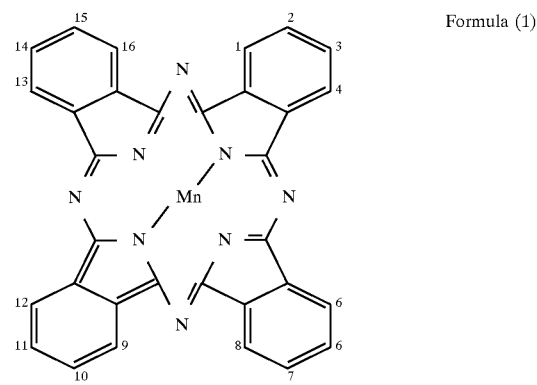

Formula (1)

is linked via an oxygen atom or a sulphur atom to an organic radical, the remaining peripheral carbon atoms being unsubstituted or substituted by any combination of atoms or groups and sulphonated derivatives thereof. Compositions comprising one or more compounds of Formula (1) and their use as cleaning materials are also disclosed along with a process for removing stains and/or grime from fabrics using these

8 Claims, No Drawings

PROCESS FOR TREATING STAINED FABRICS WITH MANGANESE PHTHALOCYANINES

This is a division of U.S. application Ser. No. 08/268,578, filed Jul. 6, 1994, now U.S. Pat. No. 5,484,915.

This invention relates to certain poly-substituted phthalocyanine compounds and certain sulphonated derivatives thereof, to compositions containing such compounds, to the use of these compounds in detergent compositions and for generating singlet oxygen and to methods of preparing such compounds.

According to the present invention there is provided a substituted phthalocyanine in which at least one of the peripheral carbon atoms in the 1–16 positions of the phthalocyanine nucleus (MnPc), as shown in Formula (1):

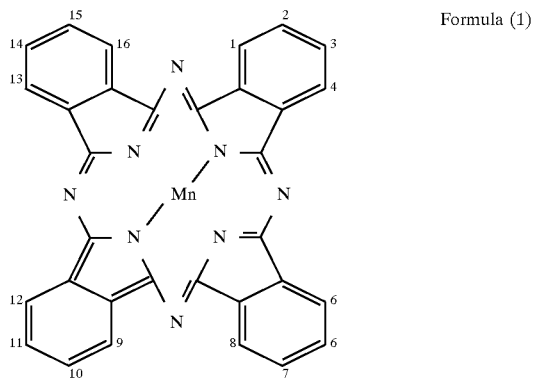

Formula (1)

is linked via an oxygen atom or a sulphur atom to an organic radical hereinafter referred to as pendant organic radical, the remaining peripheral carbon atoms being unsubstituted or substituted by any combination of atoms or groups and sulphonated derivatives thereof. Preferred phthalocyanines are those which absorb electromagnetic radiation at a wavelength from 700 nm to 900 nm.

In the phthalocyanines of the present invention each of the pendant organic radicals linked via oxygen or sulphur to the phthalocyanine nucleus is independently selected from aromatic, heterocyclic, aliphatic and alicyclic radicals, such that any one phthalocyanine nucleus may carry two or more different organic radicals.

It is preferred that each pendant organic radical is independently selected from mono-and bi-cyclic aromatic and aliphatic radicals.

Preferred mono-and bi-cyclic aromatic and heterocyclic radicals are phenyl, naphthyl, especially naphth-2-yl, phenylene, especially 1,2-phenylene, pyridyl, thiophenyl, furanyl, quinolinyl, thiazolyl, benzothiazolyl and pyrimidyl each of which may be substituted.

Where the aromatic radical is 1,2-phenylene this is attached to the phthalocyanine nucleus via two oxygen atoms or via two sulphur atoms or via one oxygen and one sulphur atom. The two oxygen atoms or two sulphur atoms or one oxygen and one sulphur atom occupy the 1,2-positions of each phenylene radical and are preferably attached to the phthalocyanine nucleus via the 2-and 3-and/or 6-and 7-and/or the 10-and 11-andor the 14-and 15-positions or are preferably attached to the phthalocyanine nucleus via the 1-and 2-and/or 3-and 4-and/or 5-and 6-and/or 7-and 8-and/or 9-and 10-and/or 11-and 12-and/or 13-and 14-and/or 15-and 16-positions.

Where the aromatic radical is 1,2-phenylene it is preferably attached to the phthalocyanine nucleus via two oxygen atoms.

Where the pendant organic radical is an aliphatic or alicyclic radical it is preferred that is is selected from $C_{1-20}$-alkyl especially $C_{1-10}$-alkyl; $C_{2-20}$-alkenyl especially $C_{3-10}$-alkenyl and $C_{4-8}$-cycloalkyl especially cyclohexyl, each of which may be substituted.

Optional substituents for the pendant organic radicals are preferably selected from $C_{1-20}$-alkyl, especially $C_{1-4}$-alkyl; $C_{1-20}$-alkoxy, especially $C_{1-4}$-alkoxy; $C_{2-20}$-alkenyl, especially $C_{2-4}$-alkenyl; $C_{1-20}$-alkylthio, especially $C_{1-4}$-alkylthio; $C_{1-20}$-alkoxycarbonyl, especially $C_{1-4}$-alkoxycarbonyl; hydroxy $C_{1-4}$-alkoxy; aryl, especially phenyl; $C_{1-4}$- alkylaryl, especially benzyl; arylthio, especially phenylthio; halogen, especially fluoro, chloro and bromo; —CN; —NO$_2$; —CF$_3$; —SO$_3$A in which A is H, or a metal or ammonium ion or substituted ammonium ion; —COR$^2$, —COOR$^2$, —CONR$^2$R$^3$, —SO$_2$R$^2$, —SO$_2$NR$^2$R$^3$, —NR$^2$R$^3$ and —OR$^2$ in which R$^2$ and R$^3$ are independently selected from —H; alkyl, especially $C_{1-4}$-alkyl; aryl, especially phenyl; and $C_{1-4}$-alkylaryl, especially benzyl.

A sub-group of phthalocyanines of the present invention preferably has from 8 to 16, more preferably from 12 to 16 and especially all 16 of the peripheral carbon atoms linked preferably via an oxygen or sulphur atom, more preferably an oxygen atom preferably to a pendant optionally substituted mono-and/or bi-cyclic aromatic radical and/or aliphatic radical more preferably phenyl and/or naphthyl and/or $C_{1-10}$-alkyl radical, more preferably a phenyl radical.

Examples of suitable atoms or groups which can be attached to any of the remaining peripheral carbon atoms of the phthalocyanine nucleus are hydrogen, halogen, sulphonate groups —SO$_3$A in which A is H, or a metal or ammonium ion or a substituted ammonium ion, and any of the pendant organic radicals described above and hereinafter represented by R. It is preferred that the atoms or groups attached to the remaining peripheral carbon atoms are selected from —H, —F, —Cl, —Br, —I, —SO$_3$H, —SO$_3$Na, —SO$_3$K, —SO$_3$Li and —SO$_3$NH$_4$ or any combination thereof. It is especially preferred that these atoms or groups are —H, —Cl, —Br, —SO$_3$H, —SO$_3$Na or —SO$_3$NH$_4$.

The sulphonated derivatives of the phthalocyanines used in the present invention carrying up to 50 SO$_3$A groups, preferably up to 40 SO$_3$A groups, more preferably up to 30 SO$_3$A groups and especially up to 16 SO$_3$A groups, which are attached directly to the phthalocyanine nucleus and/or to the pendant organic radicals are a preferred group of compounds for the present invention.

In a preferred sub-group of compounds the average number of SO$_3$A groups is preferably from 2 to 40 and more preferably from 2 to 30 and especially from 4 to 16. It is also preferred that for each pendant organic radical there is on average at least one SO$_3$A group, although each organic radical may carry none, one or more than one SO$_3$A group.

Where A is a metal ion it is preferably an alkali or alkaline earth metal ion, especially an alkali metal ion such as a sodium, potassium or lithium ion. Where A is an ammonium ion it is preferably NH$^+_4$ or a substituted ammonium ion which enhances the water-solubility of the compound or a substituted ammonium ion of the formula NQ$^+_4$ which enhances the alcohol solubility of the compound. Examples of suitable substituted ammonium ions which enhance the water solubility of the compound are mono, di, tri and tetra alkyl and hydroxyalkyl ammonium ions in which the alkyl groups preferably contain from 1 to 4 carbon atoms such as N$^+$(CH$_3$)$_4$; N$^+$(C$_2$H$_5$)$_4$; N$^+$(C$_2$H$_4$OH)$_4$; NH$^+_3$CH$_3$; NH$^+_2$(CH$_3$)$_2$ and NH$^+$(CH$_3$)$_3$.

In the substituted ammonium ion of the formula NQ$^+_4$ at least one Q is a fatty aliphatic group and any remaining Q groups are $C_{1-4}$-alkyl or H. The fatty aliphatic group represented by Q preferably contains from 4 to 16, more preferably from 7 to 12 and especially preferably 7 to 9 carbon atoms. Preferred fatty aliphatic groups are alkyl and alkenyl groups which have straight-or branched-chains. Preferred alkyl groups, represented by Q, containing 8 or 9 carbon atoms are, 3,5,5-trimethyl-hexyl, 1,1,3,3-tetramethylbutyl and 2-ethylhexyl. Examples of other suitable aliphatic chains are 1-ethyl-3-methylpentyl, 1,5-dimethylhexyl, 1-methylheptyl, 1,4-dimethylheptyl, 1,2,2-trimethylpropyl, 2-ethylbutyl, 1-propylbutyl, 1,2-dimethylbutyl, 2-methylpentyl, 1-ethylpentyl,, 1,4-dimethylpentyl, 1-methylhexyl, 3-methylhexyl, 1,3,3-trimethylbutyl, 1-methylnonyl. The substituted ammonium ion represented by A preferably has one fatty alkyl group as described above, the remaining groups being preferably H or $C_{1-4}$-alkyl, especially H or methyl. Especially preferred ammonium ions include 2-ethylhexylammonium, 1,1,3,3-tetramethylbutylammonium and 3,5,5-trimethylhexylammonium.

According to a further feature of the present invention there is provided a phthalocyanine compound of the Formula (2):

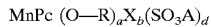
$$MnPc\,(O{-}R)_a X_b (SO_3A)_d \qquad \text{Formula (2)}$$

wherein:

MnPc is a phthalocyanine nucleus as defined in Formula (1);

each R independently is an organic radical;

each X independently is halogen or hydrogen; the O—R and X groups being attached to one or more of the 16 peripheral carbon atoms of the phthalocyanine nucleus;

A is selected from H, a metal, ammonium or substituted ammonium as described above;

a is from 4 to 16;

b is from 0 to 12;

d is an average value from 0.1 to 16;

a+b is from 1 to 16.

In a phthalocyanine of Formula (2) each of the radicals denoted by R may be selected from any of the pendant organic radicals hereinbefore defined in relation to Formula (1) above.

In a phthalocyanine of Formula (2) each halogen denoted by X is preferably independently selected from —F, —Cl, —Br and —I and it is especially preferred that each halogen denoted by X is independently —Cl or —Br.

When a+b is <16 the remainder of the 16 peripheral carbon atoms, not carrying a group O—R or X, may carry a sulphonate group —$SO_3A$ or a group represented by R. It is however preferred that the sum of a+b is 16. It is also preferred that a is 4, 8, 12 or 16.

In phthalocyanines of Formula (2) the metal ion denoted by A is preferably an alkali or alkaline earth metal ion and more preferably is selected from lithium, sodium and potassium ion. It is especially preferred that A is a sodium or an ammonium ion or hydrogen.

In the phthalocyanines of Formula (2) it is preferred that from 0 to 4 of the (O—R) groups are (O—$C_{1-10}$-alkyl) and from 16 to 12 of the (O—R) groups are (O-phenyl) or (O-naphthyl), that b is 0 and that a is 16 and that d is from 1 to 16.

Especially preferred compounds of the present invention are $MnPc(O\text{-phenyl})_{16}$, $MnPc(O\text{-Phenyl})_{16}(SO_3Na)_{16}$, $MnPc(O\text{-phenyl})_{14}(O\text{-butyl})_2$ and $MnPc(O\text{-phenyl})_{14}(O\text{-butyl})_2(SO_3Na)_{16}$, $MnPc(O\text{-phenyl})_{15}(O\text{-butyl})$, $MnPc(O\text{-phenyl})_{15},(O\text{-butyl})\,(SO_3Na)_{16}$.

The phthalocyanines of Formula (1) and Formula (2) may be prepared by the following methods:

(a) by reaction of a 1,2-dicyanobenzene of Formula (4):

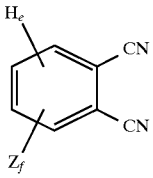

Formula (4)

wherein:

z is selected from chloro, bromo and iodo;

e is an integer from 0 to 3;

f is an integer from 1 to 4; and e+f is equal to 4 with a compound R—OH whereby up to 4 of the groups, Z, are replaced by R—O groups to form a compound of Formula (5):

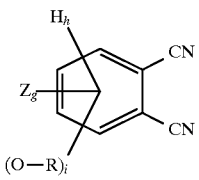

Formula (5)

wherein:

z is as described above;

R is as described above for compounds of Formula (2)

g is as integer from 0 to 3;

h is an integer from 0 to 3;

i is an integer from 1 to 4; and g+h+i is equal to 4.

followed by reaction of one or more 1,2-dicyanobenzene compounds of formula (5), or a combination of one or more compounds of Formula (5) and 1,2-dicyanobenzene, with an appropriate metal or metal salt optionally in an inert liquid at an elevated temperature to form a phthalocyanine of Formulae (1) or (2). The presence of at least one equivalent of 1,2-dicyanobenzene is required for the preparation of a compound of Formula (2) where X is H and b is 13, 14 or 15; or (b) by reaction at elevated temperatures of a compound of Formula (6):

$$MnPcZ_{(a+b)} \qquad \text{Formula (6)}$$

in which MnPc, Z, a and b are as described above with a compound, R—OH, in a polar organic medium preferably in the presence of an acid binder.

The reactions are more fully described in UK patent numbers 1,489,394 and 2,200,650, German patent number 2,455,675 and European patent application number Al 0,484,027.

In reactions of type (b) the polar organic medium which may or may not be a liquid at ambient temperature and which may only partially dissolve the reactants, preferably has a boiling point from 80° C. to 300° C., more preferably from 150° C. to 200° C. The polar organic medium is preferably inert or may act to catalyse the reaction. It is preferred that the polar organic medium is selected from N-methyl-2-pyrrolidone, dimethylformamide, methylcyclohexanol, octanol, benzyl alcohol, nitrobenzene and quinoline. It is especially preferred that in reactions of type (b) that the polar organic medium is dimethylformamide or N-methyl-2-pyrrolidone.

In reactions of type (b) the acid binder is preferably selected from alkali metal hydroxides and carbonates. It is preferred that the acid binder is lithium, sodium or potassium hydroxide, it is especially preferred that the acid binder is potassium hydroxide.

The sulphonated phthalocyanines of Formula (2) can be prepared by sulphonating a precursor of a phthalocyanine of Formula (2) in which d is 0, using sulphuric acid which may contain excess $SO_3$ (oleum). The strength of acid may vary within wide limits from 1% sulphuric acid up to 30% oleum. It is preferred that the strength of acid is from 50% sulphuric acid up to 30% oleum, it is especially preferred that the strength of acid is from 98% sulphuric to 30% oleum. The reaction temperature may vary from $-10°$ C. to $60°$ C. depending on the extent of sulphonation required. Sulphonation may be performed in an inert liquid.

As the concentration of the sulphuric acid or the oleum is increased at a fixed reaction temperature, more sulphonic acid groups are introduced into the phthalocyanine. Similarly as the reaction temperature is increased at a particular acid strength, more sulphonic acid groups are introduced into the phthalocyanine.

In the sulphonation reaction a preferred acid is 10% oleum and a preferred reaction temperature is from $-10°$ C. to $40°$ C., especially from $10°$ C. to $25°$ C.

The phthalocyanines can be sulphonated directly on the Pc nucleus, particularly when any of the 1–16 positions in unsubstituted (i.e. the 1–16 peripheral carbon atoms carry a hydrogen atom) or on any of the pendant organic groups R or $R^1$, or on both the Pc nucleus and the pendant organic groups.

The manganese phthalocyanines of the present invention may be conveniently prepared from the corresponding dihydrogen analogues by reaction with manganese acetate in aqueous media. The methods of preparation of these phthalocyanine compounds forms a further feature of the present invention.

According to a further feature of the present invention there is provided a process for removing stains and/or grime from fabrics which comprises treating a stained fabric with a composition comprising at least one compound of Formula (1) or Formula (2).

According to a further feature of the present invention there is provided a composition comprising a phthalocyanine of Formula (1) in which at least one of the peripheral carbon atoms in the 1–16 positions of the peripheral carbon atoms is linked via an oxygen or a sulphur atom to an organic radical the remaining peripheral carbon atoms being unsubstituted or substituted by any combination of atoms or groups and sulphonated derivatives thereof or a phthalocyanine of Formula (2).

According to a further feature of the present invention there is provided the use of compositions described above as a cleaning material.

The compositions may be aqueous compositions and may further comprise detergents widely available in washing and cleaning technology such as soap or synthetic detergents, other commonly available detergent additives such as soil suspending agents, optical brightening agents, sud or foam control agents, perfume, surfactants such as alkyl sulphonates, paraffin sulphonates and alkylbenzene sulphonates, ethoxylated alcohols or betaines, and alkaline detergency builders such as sodium carbonate, silicate, orthophosphates and polyphosphates.

The process for removing stains and/or grime is preferably carried out at temperatures from $10°$ C. to $80°$ C., more preferably from $20°$ C. to $60°$ C. and especially from $35°$ C. to $45°$ C. Suitable process times for stain and/or grime removal are typically from 5 minutes to 5 hours, preferably from 10 minutes to 1 hour.

The aqueous composition preferably contains from 0.0005 g to 1.0 g per liter of compounds of Formula (1) or Formula (2), more preferably from 0.001 g/l to 0.1 g/l.

The efficacy of the stain removal process generally depends on the concentration of compounds of Formula (1) or Formula (2) in the wash solution the process temperature and the process time. The process is generally more effective with higher concentrations of compounds of Formula (1) or Formula (2) at higher process temperatures and with longer process times.

According to a further feature of the present invention there is provided a process for the generation of singlet oxygen by irradiation in the presence of oxygen of a substituted phthalocyanine, in which at least one of the peripheral carbon atoms in the 1–16 positions of the phthalocyanine nucleus (MnPc), as shown in Formula (1) is linked via an oxygen atom to an organic radical, the remaining peripheral carbon atoms being unsubstituted or substituted by any combination of atoms or groups and sulphonated derivatives thereof with electromagnetic radiation of wavelength from 650 to 900 nm. Suitable sources of electromagnetic radiation includes sunlight and lasers with emissions in the 650–900 nm region.

Singlet oxygen has a greater energy than ground-state, triplet oxygen. The singlet and triplet states of oxygen are distinguished by the singlet state having two electrons of anti-parallel spins and the triplet state having an uncoupled pair of electrons with parallel spins. The singlet oxygen is also distinguished from triplet oxygen because it is a highly reactive species with a lifetime from a few microseconds to several hundred microseconds. During its lifetime singlet oxygen has the potential to react before being deactivated. The reactivity of the singlet oxygen may be utilised in a wide range of applications which include photobleaching, photodeodorising, photodynamic therapy (PDT), treatment of visible stains on a range of material surfaces, surfaces include fabric, cement, stone, brick, glass, etc., biocidal, degradation of plastics, paper and pulp bleaching, environmental clean-up, anti-microbial action on fibers, incorporation into various products for example in fabrics as deodorisers, into paints or film treatments to destroy microorganisms or contaminants, into cement products, glass products and paints to confer self-cleaning properties, sterilising swimming pools and as a surface treatment to prevent yellowing/discoloration of paper. For photobleaching and photodeodorising application the present phthalocyanines can be incorporated into detergent formulations which are used in a wide range of cleaning applications.

The phthalocyanine compounds of the present invention promote the formation of singlet oxygen under the influence of electromagnetic radiation, particularly in the 700–800 nm region and are capable of promoting singlet oxygen formation in localised areas.

Measurement of triplet oxygen yields after laser excitation and singlet oxygen emission yields allows calculation of singlet oxygen generating efficiency (S). The experimental details for these measurements are more fully described in Gorman et al, Journal of the American Chemical Society [1987], 109, 3091; Gorman et al, Journal of the American Chemical Society [1989], 111, 1876 and Gorman et al, Photochemistry and Photobiology [1987] 45(2), 215.

The invention is further illustrated by the following examples in which all parts and percentages are by weight unless otherwise indicated.

EXAMPLE 1

Preparation of hexadeca(phenoxy) manganesephthalocyaninehexadeca (sulphonic acid sodium salt)

(i) Preparation of 1,2-dicyano-3,4,5,6-tetraphenoxybenzene

A mixture of 1,2-dicyano-3,4,5,6-tetrachlorobenzene (50 parts), phenol (106 parts), potassium carbonate (104 parts) and dimethylformamide (200 parts) was stirred and heated at 70° C. for 2 hours before pouring into water (500 parts). The aqueous mixture was extracted with chloroform (2×300 parts). The chloroform extract was washed with a 5% aqueous solution of sodium hydroxide (2×250 parts) and then with water (2×250 parts). The chloroform extract was dried over anhydrous magnesium sulphate, filtered and the chloroform was removed by distillation under reduced pressure to leave a brown oil. The brown oil was dissolved in hot butan-1-ol and allowed to cool slowly. 1,2-Dicyano-3,4,5,6-tetraphenoxybenzene (62.2 parts, 67%) was obtained as a pale yellow solid m.p. 149°–151° C.

(ii) Preparation of hexadeca(phenoxy) dilithium phthalocyanine

Lithium (0.42 parts) was dissolved in butan-1-ol (50 parts) with stirring at 100° C. over 4 hours before adding 1,2-dicyano-3,4,5,6-tetra phenoxy)benzene (10 parts). The reaction mixture was stirred at 120° C. for 30 minutes. The solution was cooled and a green solid was collected by filtration. The sold was washed with methanol (3×50 parts) and dried to give hexadeca(phenoxy)dilithium phthalocyanine (5.5 parts) m.p. >250° C.

(iii) Preparation of hexadeca(phenoxy) dihydrophthalocyanine

A mixture of hexadeca(phenoxy) dilithium phthalocyanine (3.0 parts) and toluene (100 parts) was stirred at 20° C. and p-toluene sulphonic acid (1.14 parts) was added slowly. The reaction mixture was stirred at 20° C. for 30 minutes before adding activated carbon and filtering through Claracel flo filter aid. After filtering the solution was passed through a silica gel column washing with toluene. The solvent was removed by distillation under reduced pressure to leave a green solid. The solid was stirred in methanol (50 parts), filtered off and washed with water and dried to give hexadeca(phenoxy) dihydrophthalocyanine (2.68 parts) m.p. >250° C.

(iv) Preparation of hexadeca(phenoxy) dihydrophthalocyaninehexadeca (sulphonic acid sodium salt The phthalocyanine (1 part) from iii) above was added to 10% oleum (2 parts) at 0° C. over 15 minutes. The mixture was allowed to warm to 20° C. and was stirred for 3 hours before pouring into a mixture of ice and water (100 parts). The resulting solution was neutralised to pH 7 using 48% sodium hydroxide solution before dialysing in Visking tubing and evaporating to give hexadeca(phenoxy) dihydrophthalocyaninehexadeca(sulphonic acid sodium salt).

(v) Preparation of hexadeca(phenoxy) manganesephthalocyanine hexadeca (sulphonicacid sodium salt The phthalocyanine (1 part) from iv) above was dissolved in water (10 parts) and manganese acetate (0.047 parts) in water (1 part) was added. The reaction mixture was stirred at ambient temperature overnight. The reaction mixture was evaporated to leave hexadeca(phenoxy)manganese phthalocyanine hexadeca(sulphonic acid sodium salt) as an organge-brown solid $\lambda_{max(water)}$=789 nm.

We claim:

1. A process for removing stains and/or grime from fabrics which comprises treating a stained fabric with a composition comprising at least one phthalocyanine compound selected from the group consisting of (a) a phthalocyanine in which at least one of the peripheral carbon atoms in the 1–16 positions of the phthalocyanine nucleus (MnPc) as shown in Formula (1):

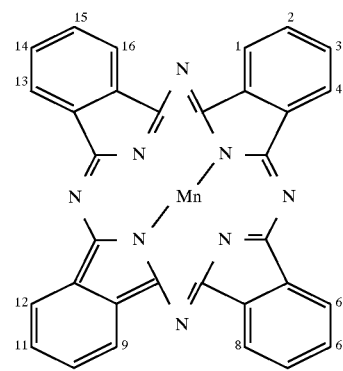

Formula (1)

is linked via an oxygen atom or a sulphur atom to an organic radical, the remaining peripheral carbon atoms being unsubstituted or substituted by any combination of atoms or groups selected from the group consisting of —F, —Cl, —Br, —I, —$SO_3H$, —$SO_3Na$, $SO_3K$, $SO_3Li$ and $SO_3NH_4$ and (b) a phthalocyanine compound of the Formula (2):

$$MnPc(O—R)_a X_b (SO_3A)_d \qquad \text{Formula (2)}$$

wherein:

MnPc is a phthalocyanine nucleus as defined in Formula (1);

each R independently is an organic radical;

each X independently is halogen or hydrogen; the O—R and X groups being attached to one or more of the 16 peripheral carbon atoms of the phthalocyanine nucleus;

A is selected from H, a metal, ammonium or substituted ammonium as described above;

a is from 4 to 16;

b is from 0 to 12;

d is an average value from 0.1 to 16; and a+b is from 1 to 16.

2. A process as claimed in claim 1 in which from 0 to 4 of the (O—R) groups in the phthalocyanine compound are (O—$C_{1-10}$-alkyl) and from 16 to 12 of the (O—R) groups are (O-phenyl), b is 0, a is 16 and d is from 1 to 16.

3. A process as claimed in claim 1 in which the phthalocyanine compound is of the Formula MnPc(O-phenyl)$_{16}$.

4.. A process as claimed in claim 1 in which the phthalocyanine compound is of the Formula MnPc(O-phenyl)$_{16}$ (SO$_3$Na)$_{16}$.

5. A process as claimed in claim 1 in which the phthalocyanine compound is of the Formula MnPc(O-phenyl)$_{14}$(O-butyl)$_2$.

6. A process as claimed in claim 1 in which the phthalocyanine compound is of the Formula MnPc(O-phenyl)$_{14}$(O-butyl)$_2$(SO$_3$NA)$_{16}$.

7. A process as claimed in claim 1 in which the phthalocyanine compound is of the Formula MnPc(O-phenyl)$_{15}$(O-butyl).

8. A process as claimed in claim 1 in which the phthalocyanine compound is of the Formula MnPc(O-phenyl)$_{15}$(O-butyl) (SO$_3$Na)$_{16}$.

* * * * *